United States Patent
Furukawa et al.

(10) Patent No.: US 9,971,836 B2
(45) Date of Patent: May 15, 2018

(54) GROUP FORMING METHOD, DATA COLLECTING METHOD AND DATA COLLECTING APPARATUS

(71) Applicant: FUJITSU LIMITED, Kawasaki-shi, Kanagawa (JP)

(72) Inventors: Tadanobu Furukawa, Kawasaki (JP); Miki Okamoto, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 546 days.

(21) Appl. No.: 14/592,959

(22) Filed: Jan. 9, 2015

(65) Prior Publication Data
US 2015/0248471 A1 Sep. 3, 2015

(30) Foreign Application Priority Data
Mar. 3, 2014 (JP) ................. 2014-040884

(51) Int. Cl.
G06F 17/30 (2006.01)
G06Q 10/10 (2012.01)
G06Q 30/02 (2012.01)

(52) U.S. Cl.
CPC ....... *G06F 17/30864* (2013.01); *G06Q 10/10* (2013.01); *G06Q 30/0201* (2013.01)

(58) Field of Classification Search
CPC combination set(s) only.
See application file for complete search history.

(56) References Cited

U.S. PATENT DOCUMENTS

2008/0300964 A1* 12/2008 Raghunandan ........ G06Q 30/02 705/14.66
2010/0058210 A1* 3/2010 Johnson ................. G06Q 30/02 715/764
2010/0306249 A1* 12/2010 Hill .................... G06F 17/30867 707/769
2012/0179703 A1* 7/2012 Ajitomi ............. G06F 17/30386 707/765
2014/0089000 A1* 3/2014 Takata ................... G06F 19/321 705/2

FOREIGN PATENT DOCUMENTS

JP 2010-108119 5/2010
JP 2012-216168 11/2012

OTHER PUBLICATIONS

Chinese Office Action dated Sep. 4, 2017 for corresponding Chinese Patent Application No. 201510094420.5, with English Translation, 25 pages.

* cited by examiner

*Primary Examiner* — Shyue Jiunn Hwa
(74) *Attorney, Agent, or Firm* — Fujitsu Patent Center

(57) ABSTRACT

A data collecting method performs a process to collect data open to public by investigation targets of which an attribute varies with respect to passage of time. The method is performed by a computer by executing a program to perform a process including: creating a keyword for searching the data of the investigation targets having a first attribute that lacks with respect to a population of the investigation targets based on a distribution of a second attribute different from the first attribute; estimating the first attribute of the investigation targets of data that is collected using the keyword; and replenishing the investigation targets to be replenished in the population by the investigation targets that are estimated as having the lacking first attribute.

11 Claims, 13 Drawing Sheets

FIG.3

| ATTRIBUTE | | | | OCCUPATION | | | | |
|---|---|---|---|---|---|---|---|---|
| | | | | MIDDLE AND HIGH SCHOOL STUDENT | UNIVERSITY AND COLLEGE STUDENT | EMPLOYED PERSON | HOUSEWIFE | SENIOR | OTHERS |
| SEX | MALE | 130000 | MARRIED | 65000 | — | — | 50000 | 0 | 10000 | 5000 |
| | | | UNMARRIED | 65000 | 5000 | 5000 | 30000 | 0 | 5000 | 20000 |
| | FEMALE | 105000 | MARRIED | 55000 | — | — | 20000 | 30000 | 5000 | 0 |
| | | | UNMARRIED | 50000 | 10000 | 5000 | 20000 | 0 | 5000 | 10000 |

| OCCUPATION ESTIMATING MODEL | | | |
|---|---|---|---|
| KEYWORD | OCCUPATION SCORE | | |
| | MIDDLE AND HIGH SCHOOL STUDENT | ... | OTHERS |
| CLUB ACTIVITY | 0.5 | | 0.01 |
| TEST | 0.45 | | 0.2 |
| CLASS | 0.4 | | 0.1 |
| ... | ... | ... | ... |

| KEYWORD VERSUS USER TABLE | |
|---|---|
| KEYWORD | USER ID LIST |
| CLUB ACTIVITY | 00002, 00383, ... |
| TEST | 00002, 00005, ... |
| CLASS | 00014, 00876, ... |
| ... | ... |

FIG.9

| 55 |
|---|
| NEW USER CANDIDATE LIST |
| USER ID |
| 00002 |
| 00014 |
| 00383 |
| ... |

FIG.10

| KEYWORD FOR EACH USER TABLE 56 ||
|---|---|
| USER ID | KEYWORD |
| 00002 | CLUB ACTIVITY × 3, FRIEND × 2, GAME × 5, ⋯ |
| 00014 | CLASS × 4, PROGRAM × 1, OVERTIME × 2, ⋯ |
| 00383 | CLUB ACTIVITY × 2, GAME × 8, LESSON × 1, ⋯ |
| ... | ... |

FIG.11

ESTIMATED ATTRIBUTE VALUE FOR EACH USER TABLE — 57

| USER ID | ESTIMATED VALUE | | | ESTIMATED ATTRIBUTE |
| --- | --- | --- | --- | --- |
| | MIDDLE AND HIGH SCHOOL STUDENT | ... | OTHERS | |
| 00002 | 0.53 | ... | 0.11 | MIDDLE AND HIGH SCHOOL STUDENT |
| 00014 | 0.01 | ... | 0.74 | OTHERS |
| 00383 | 0.46 | ... | 0.2 | MIDDLE AND HIGH SCHOOL STUDENT |
| ... | ... | ... | ... | ... |

| NEW USER LIST |
| --- |
| USER ID |
| 00002 |
| 00383 |
| 00876 |
| ... |

GROUP FORMING METHOD, DATA COLLECTING METHOD AND DATA COLLECTING APPARATUS

CROSS-REFERENCE TO RELATED APPLICATIONS

This application is based upon and claims the benefit of priority of the prior Japanese Patent Application No. 2014-040884, filed on Mar. 3, 2014, the entire contents of which are incorporated herein by reference.

FIELD

The embodiments discussed herein are directed to a data collecting technique.

BACKGROUND

In recent years, many users in various layers such as students, house wives, employed persons, etc., use the Web (World Wide Web) to study about things thought in daily life and a way of thinking about things, or to exchange information in various fields with other users. Because of a large number of users use the Web, there is a case where a market study is performed by using the Web to use the result of the market study in developing a commercial product.

In order to extract users as investigation targets, a technique is suggested to extract users whose information contains a condition for search in a user attribute and search log. Also suggested is a technique to calculate a degree indicating superiority in the analysis by using numerical information regarding a contribution activity of a user.

The following patent documents disclose a background art.

Patent Document 1: Japanese Laid-Open Patent Application No. 2010-108119
Patent Document 2: Japanese Laid-Open Patent Application No. 2012-216168

The blog (Web Blog) is an example where users of the Web open their opinions to public. There may be a case where the contents of the blog on the Web are used for the investigation for products development. In the investigation for products development, a population is created by sampling an appropriate number of persons for each predetermined attribute to grasp an actual condition of each user as a consumer or customer by analyzing the blog of each user belonging to the created population.

The attribute of each user in the population changes with passage of time such that, for example, changing from a student to an employed person. Additionally, there may be a case where a user stops updating the blog or ends the blog itself.

On the other hand, in a case of surveying a product market, an accurate comparison with a past 20 survey result cannot be made unless an attribute ratio is maintained constant. Accordingly, in order to correspond to the above-mentioned change, a user whose attribute has been changed is omitted from the population to maintain the attribute rate in the population constant, and a new user having the same attribute is added to the population.

However, if the above-mentioned conventional technique is used, which effectively extracts users when investigation is made, it is difficult to maintain an attribute ratio in the population at a fixed value in response to the changes in the user attribute with passage of time.

Accordingly, it is desirous to create a population of investigation targets by considering an attribute ratio in the population ratio.

SUMMARY

There is provided according to an aspect of the embodiments a group forming method performed by a computer by executing a program to perform a process, including: extracting a plurality of keywords from public information of a first group of contributors including a contributor for which an attribute value regarding a first attribute is calculated as corresponding to a predetermined attribute value, the first attribute being an attribute with respect to each contributor of the public information and an attribute value of the first attribute varying with respect to passage of time; forming a first contributor group set by forming a contributor group of the public information containing a corresponding keyword with respect to each keyword contained in the plurality of keywords; forming a second contributor group set with respect to new public information by forming a contributor group of the new public information containing a corresponding keyword based on each keyword contained in the plurality of keywords; identifying a contributor group of which a distribution of an attribute value of an attribute different from the first attribute indicates a predetermined similarity relationship from among contributor groups contained in the second contributor group set that are formed by using the same keyword as a keyword of each contributor group contained in the first contributor group set; and forming a new contributor group corresponding to the first contributor group by using a contributor whose attribute vale regarding estimated the first attribute is calculated as corresponding to the predetermined attribute value from among contributors contained in the identified contributor group.

There is provided according to another aspect of the embodiments a data collecting method of performing a process to collect data open to public by investigation targets of which attributes vary with respect to passage of time, the method being performed by a computer by executing a program to perform a process including: creating a keyword for searching the data of the investigation targets having a first attribute that lacks with respect to a population of the investigation targets based on a distribution of a second attribute different from the first attribute; estimating the first attribute of the investigation targets of the data that is collected using the keyword; and replenishing the investigation targets to be replenished in said population by the investigation targets that are estimated as having said lacking first attribute.

There is provided according to a further aspect of the embodiments a data collecting apparatus that collects data open by investigation targets of which attributes vary with respect to passage of time, the data collecting apparatus including: a creating part that creates a keyword for searching said data of the investigation targets having a first attribute that lacks with respect to a population of the investigation targets based on a distribution of a second attribute different from the first attribute; an estimating part that estimates the first attribute of the investigation targets of the data that is collected using the keyword; and a sampling part that replenishes the investigation targets to be replenished in said population by the investigation targets that are estimated as having said lacking first attribute.

BRIEF DESCRIPTION OF DRAWINGS

FIG. 3 is an illustration of a reference distribution;

FIG. 6 is an illustration of a previously prepared database and an example of data in a table;

FIG. 7 is an illustration of a previously prepared database and an example of data in a table;

FIG. 9 is an illustration of a data structure of a new user candidate set;

FIG. 10 is an illustration of a data structure of a keyword for each user table;

FIG. 11 is an illustration of a data structure of an estimated attribute for each user table;

FIG. 12 is an illustration of data of a new user list;

DESCRIPTION OF EMBODIMENT(s)

A description will now be given of embodiments with reference to the drawings.

Figure 1:
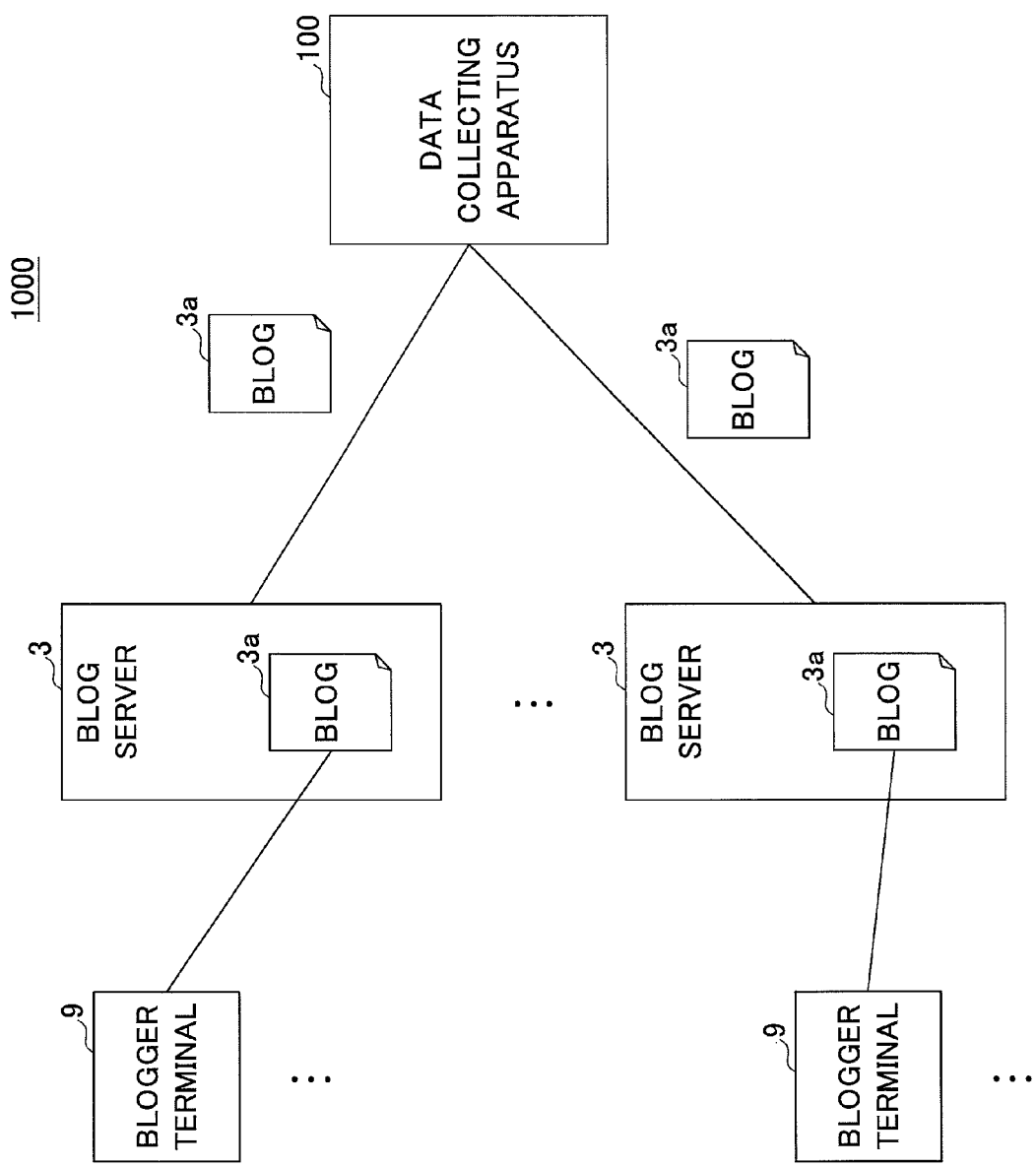
FIG. 1 is a block diagram illustrating a system structure according to an embodiment.

FIG. 1 is a block diagram illustrating a structure of a system according to an embodiment. In FIG. 1, the system 1000 includes a data collecting apparatus 100, one or more blog servers 3 and one or more blogger terminals 9.

The data collecting apparatus 100 is connected with the one or more blog servers 3 via a network to search and collect blogs 3a in the blog servers 3. The data collecting apparatus 100 provides a highly reliable data set in collecting the blogs 3a.

The data set provided by the data collecting apparatus is created for the purpose of extracting information that serves as a useful reference for product development, such as, for example, a user's preference to a commercial product on the market.

Each blog server 3 has various management functions for blogs, and provides a memory area for blogs to a blogger (user).

The blogger terminal 9 is a terminal used by a blogger, and creates, updates, and deletes the blog 3a by using the service of the blog server 3.

Figure 2:
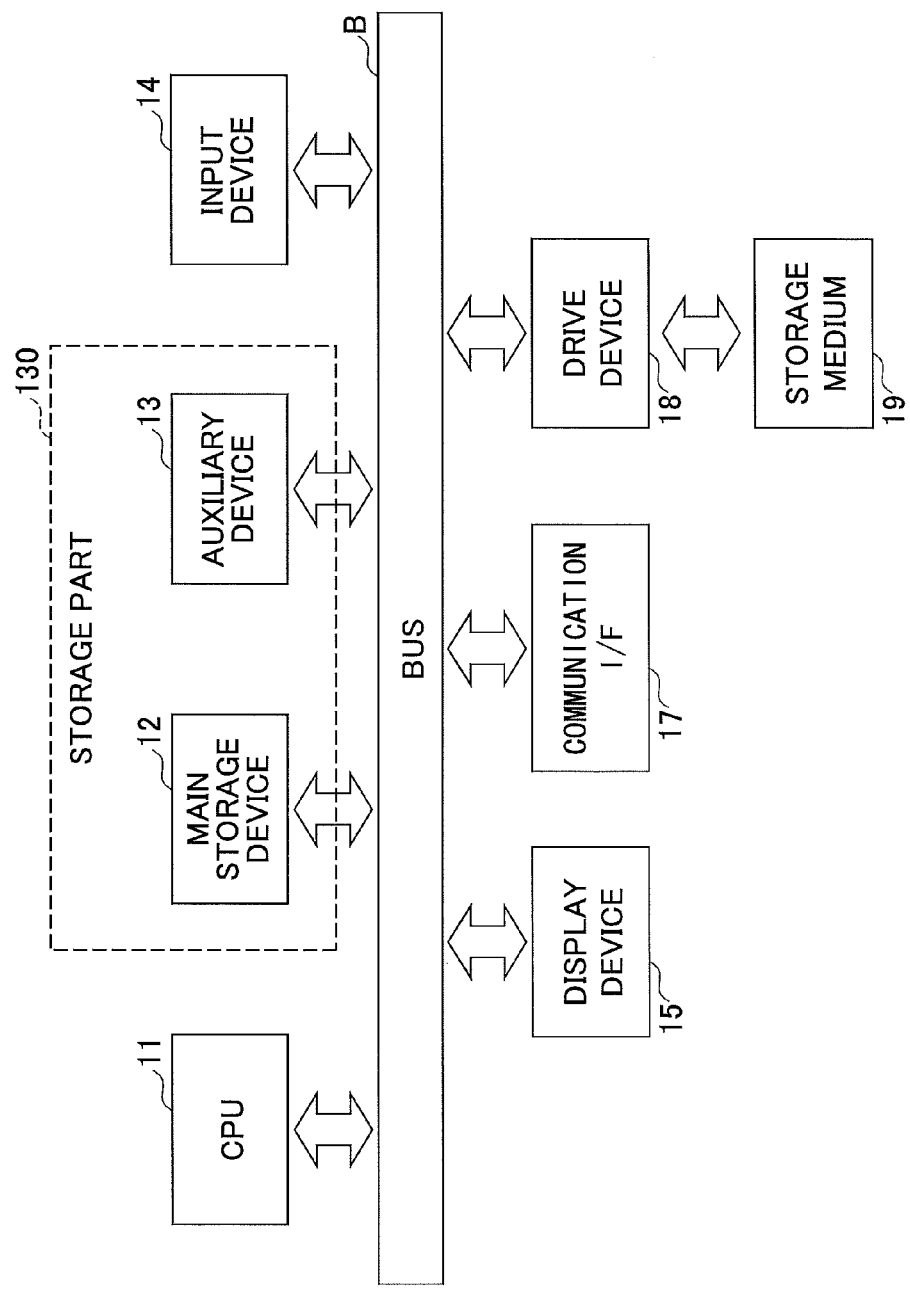
FIG. 2 is a block diagram illustrating a hardware structure of a data collecting apparatus.

FIG. 2 is a block diagram illustrating a hardware structure of the data collecting apparatus 100. The data collecting apparatus 100 is a terminal controlled by a computer. As illustrated in FIG. 2, the data collecting apparatus 100 includes a CPU (Central Processing Unit) 11, a main storage device 12, an auxiliary storage device 13, an input device 14, a display device 15, a communication I/F (interface) 17 and a drive device, which are connected to a bus B.

The CPU 11 controls the data collecting apparatus in accordance with a program stored in the main storage device 12. The main storage device 12 includes a RAM (Random Access Memory), a ROM (Read Only Memory), etc., to store or temporarily save programs executed by the CPU 11, data necessary for processing by the CPU 11, data acquired by a processing of the CPU 11, etc.

The auxiliary storage device 13 includes an HDD (Hard Disk Drive) or the like to store data such as programs for executing various processes. A part of the program stored in the auxiliary storage device 13 is loaded to the main storage device 12 and is executed by the CPU 11, which materializes various kinds of processes. A storage part 130 includes the main storage device 12 and/or the auxiliary storage device 13.

The input device 14 is used by a user to input various kinds of information necessary for the processing by the data collecting apparatus 100. The display device 15 displays various kinds of information necessary for the control by the CPU 11. The communication I/F 17 performs communication through a wired or wireless network. The communication by the communication I/F 17 is not limited to a weird or wireless communication.

The program that materializes the process performed by the data collecting apparatus 100 is provided to the data collecting apparatus 100 by a storage medium 19 such as, for example, a CD-ROM (Compact Disc Read Only Memory) or the like.

The drive device 18 interfaces between the storage medium 19 (for example, a CD-ROM, etc.,) set in the drive device 18 and the data collecting apparatus 100.

Additionally, programs for materializing various kinds of processes according to the present embodiment mentioned later may be stored in the storage medium 19. The programs stored in the storage medium 19 are installed in the data collecting apparatus 100 via the drive device 18. The thus-installed programs are executable by the data collecting apparatus 100.

Note that the storage medium 19 for storing programs is not limited to a CD-ROM, and any computer readable medium may be used as the storage medium 19. As a computer readable storage medium other than a CD-ROM, there are a portable recording medium such as a DVD disk, a USB memory, etc., and a semiconductor memory such as a flash memory, etc.

In order to use blogs for a market research or survey, first an appropriate population is created by sampling users. That is, a population is created so that a ratio of a user attribute in the population is substantially equal to a ratio of the attribute indicated by data of a domestic population distribution or the like. For example, a reference is made to a population distribution based on sex and occupation as an attribute to determine the number of samples so that a ratio for each attribute is substantially equal to that of the created population. Hereinafter, the distribution of the number of samples referred to when creating the population is referred to as the "reference distribution".

FIG. 3 is an illustration illustrating an example of the reference distribution. In FIG. 3, the reference distribution 1 is a table indicating the number of samples by a matrix using sex and occupation as an attribute. The attribute value of sex is "male" and "female". The attribute value of occupation is "middle and high school student", "university student", "employed person", "housewife", "senior", "others", etc. For example, in the reference distribution 1, a ratio of male and female and a ratio of occupation are set to be substantially the same. The population is created based on the reference distribution 1.

In the present embodiment, the population is created with the same ratio of attribute based on the reference distribution 1. Then, if a user excluded from the population appears with passage of time, a user having a possibility of having the same attribute value with the user to be excluded from the population are found so as to replenish the population.

The attribute of each user may change such that a user who is a middle and high school student grows to a university student. Additionally, there may exist a user who stops updating one's blog. The user's attribute can be estimated by applying a model to the contributed article of the user. Such a model can be created by applying a document classification technique.

The model is one that classifies users based on the terms written in the article and a frequency of appearance of the terms. By using the model, if, for example, a term "club activity" is written in the article, a probability of being a middle and high school student is raised. According to this method, it is necessary to collect a plurality of articles for each user.

Additionally, in a case where a consumer's actual condition is continuously observed, if a completely different tendency appears due to user change, it is erroneously detected that the consumer's actual condition is suddenly changed. In order to accurately investigate the consumer's actual condition, it is desirous to select a user who makes a contribution having the same tendency as the user who is excluded from the population.

As an example of a random sampling method, the following procedure is considered.

1. Acquire an appearance frequency distribution Pall of a term in the user set of each attribute value before changing the sampling.

2. Collect contributions with respect to a candidate user who is selected at random.

3. Acquire an appearance distribution Pu of the term of the user and an estimated attribute value.

4. Adopt the candidate user as a new user if a similarity between Pall and Pu is larger than or equal to a threshold value and if the estimated attribute value coincides with that of a lacking cell. Here, the cell is each item, for example, provided in the table illustrated in FIG. 3. For example, the cell corresponding to the attribute value "MALE*MARRIED*EMPLOYED PERSON" indicates 50000 in the table of FIG. 3. This means that there must exist 50000 active users who correspond to the attribute value "MALE*MARRIED*EMPLOYED PERSON". However, if the number of active users corresponding to the attribute value "MALE*MARRIED*EMPLOYED PERSON" has been decreased to 49000 with passage of time, the cell corresponding to the attribute value "MALE*MARRIED*EMPLOYED PERSON" is referred to as the lacking cell to which active users must be added.

5. Repeat the above-mentioned steps 2 to 4, and ends the process when the number of adopted new users corresponds to the number of the lacking users.

In this example, because a provability of adopting the randomly selected user is low and the number of collections is increased, it is possible that a sufficient number of users cannot be acquired due to a limitation in the number of collections. Thus, the random sampling method is inefficient because the random sampling method cannot collect only users having an attribute value (for example, "middle and high school student") for which replenishment is desired.

The data collecting apparatus 100 according to the present embodiment does not randomly select users to be collected but selects only users who have contributed at least once an article containing a keyword that is characteristic to the user who is to be replenished.

In a case where a keyword is set randomly, there may be a case where a user who contributes only an article of a specific topic or subject is collected, which results in that the population does not reflect the consumer's actual condition.

Thus, according to the present embodiment, a keyword is set to avoid a "bias", which is deflection of tendency of the contribution contents of users who are objects to be collected. Specifically, the keyword is set to satisfy the following conditions (1) and (2).

(1) In the estimation model to estimate the attribute of the above-mentioned reference 20 distribution 1 for each user, important terms, which are easily classified into the attribute value to be acquired (for example, "middle and high school student"), are added as keywords in an order starting from a higher rank.

According to the above-mentioned condition (1), a possibility of coincidence of the estimation result of the user with the attribute value to be acquired is raised, which reduces the number of collections.

(2) The bias in the tendency of the contribution contents is defined by a distribution of an attribute other than sex and occupation indicated in the reference attribute (hereinafter, referred to as the "non-adjusted attribute") to set the keyword so that a difference between before and after the sampling review becomes small.

An adjusted attribute is an attribute to be an investigation target such as sex, occupation, etc. The non-adjusted attribute is an attribute not to be an investigation target. As the non-adjusted attribute, there is, for example, a hobby attribute, etc. The hobby attribute includes more than 50 attributes such as gourmet, movie, etc. The number of attribute values of the hobby attribute is larger than other demographic attributes, and it is difficult to adjust the number of attribute values of the hobby attribute.

Moreover, experimentally, it has been found by preliminary experiments that a user whose tendency of contribution contents is similar can be extracted by focusing on the hobby attribute.

Furthermore, the hobby attribute is useful in a system of extracting a consumer's actual condition, but the same solution can be attempted by using other attributes. As an example of other attributes, if a disaster prevention relating investigation is performed, a place of residence such as Tokyo Prefecture, Osaka Prefecture, etc., may be used as an attribute.

Figure 4:
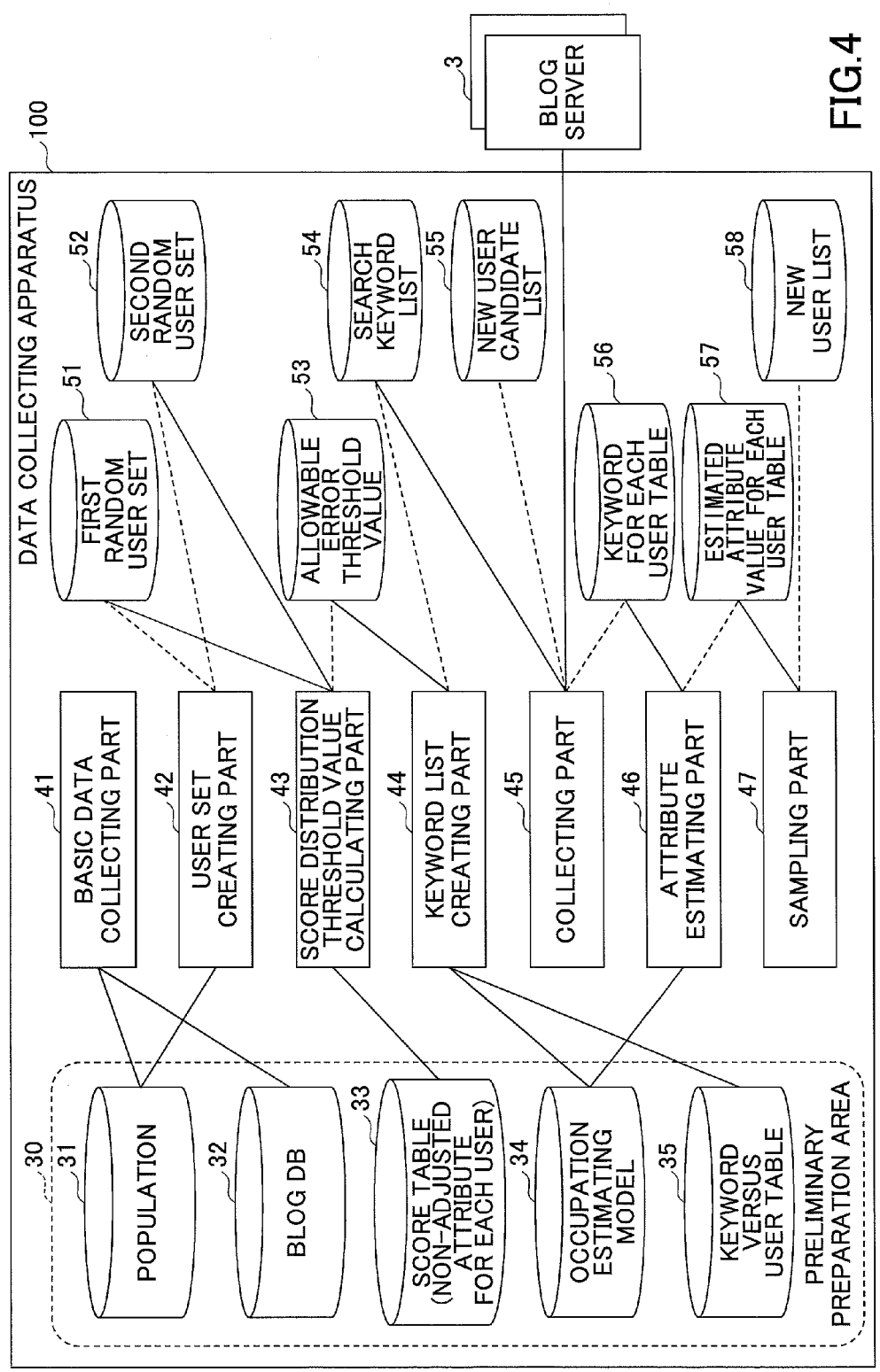
FIG. 4 is a block diagram of a functional structure of the data collecting apparatus.

FIG. 4 is a block diagram illustrating a functional structure of the data collecting apparatus 100. In FIG. 4, solid lines denote inputs and dashed lines denote outputs.

As illustrated in FIG. 4, the data collecting apparatus 100 includes, a basic data collecting part 41, user set creating part 42, score distribution threshold value calculating part 43, keyword list creating part 44, collecting part 45, attribute estimating part 46 and sampling part 47.

A preliminary preparation area 30 of a storage part 130 stores a blog DB 31, occupation classification table 32, score table 33, occupation estimating model 34, keyword versus user table 35, etc. Further, the storage part 130 stores a first random user set 51, second random user set 52, allowable error threshold value 53, search keyword list 54, new user candidate set 55, keyword for each user table 56, estimated attribute value for each user table 57 and new user list 58, etc.

The basic data collecting part 41 creates the population 31 by searching a user from the blog server 3 in response to the ratio of the attribute based on the reference distribution 1. The basic data collecting part 41 acquires the blog 3*a* of each user contained in the population 1 from the blog server 3, and stores the acquired blog 3*a* in the blog DB 32.

The user set creating part 42 creates two user sets from the population 31 acquired by the basic data collecting part 41. A user ID that identifies each user contained in each of the user sets is recorded in either one of the first random user set 51 and the second random user set 52.

The score distribution threshold calculating part 43 calculates a score distribution for each hobby attribute with respect to the two user sets created by the user set creating part 42, and acquires the allowable error threshold value 53 by comparing the two score distributions. When calculating the score distributions, the score table 33 is referred to.

The keyword list creating part 44 sets one or more keywords that raise a probability of belonging to each attribute, and creates a keyword list for which the score distribution of the hobby attribute value is within the allowable error threshold value 53.

Here, the probability of belonging to an attribute means, for example, "likeliness of middle and high school student". The probability of belonging to an attribute can be raised by setting a plurality of keywords. The probability is judged by referring to the occupation estimating model 34. In the calculation of the score distribution of the hobby attribute, the keyword versus user table 35 is referred to.

The keyword list creating part 44 creates the search keyword list 54 that indicates a keyword for searching the article contents of the blog 3*a*.

The collecting part 54 collects the blogs 3*a* by searching the blog 3*a*, which is created by a user having the same attribute as the excluded user by using a keyword of the search keyword list 54. The collecting part 45 renders the user of the collected blog 3*a* as a new user candidate, and stores the new user candidate set 55 indicating the user ID of the new candidate user in the storage part 130.

The collecting part 45 counts the number of appearances of the keyword of the keyword list 54 for each new user candidate. The number of appearances of the keyword of the keyword list 54 for each new user candidate is recorded in the estimated attribute value for each user table 57, and the estimated attribute value for each user table 57 is stored in the storage part 130.

The attribute estimating part 46 estimates the occupation of each user by applying the occupation estimating model 34 to the articles of the collected blogs 3*a*. The estimated attribute value for each user table 57 in which the estimated value is related to each user is stored in the storage part 130.

Figure 5:
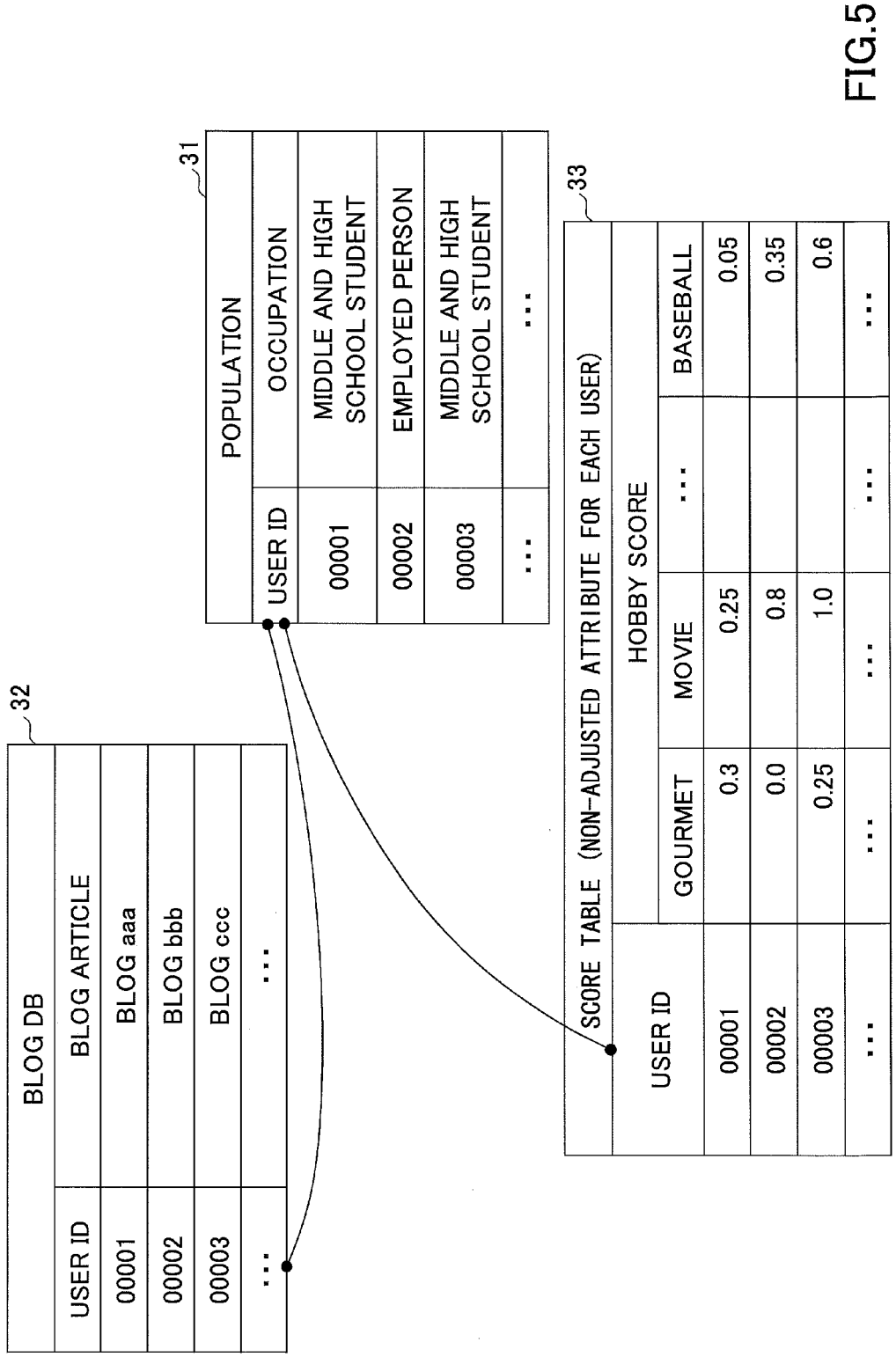
FIG. 5 is an illustration of a previously prepared database and an example of data in a table.

A description is given below of the tables stored in the storage part 130. FIGS. 5 through 7 are illustrations of data stored in a preliminary prepared DB and tables. FIG. 5 illustrates a data structure regarding a user contained in the population.

The population 31 is a table in which an occupation is related to each user ID. The user ID is an identifier to uniquely identify each user in the population. The same applies to the DB and table mentioned later. The occupation is an occupation of each user that is estimated from the article of the blog 3*a*. As the attribute of the occupation, the attribute of the occupation of the reference distribution 1 illustrated in FIG. 3 is used.

The blog DB 32 is a table in which the article data of the blog 3*a* is related to each user ID. The blog 3*a* acquired from the blog server 3 is stored in the blog article, or the article indicates an address of an area where the blog 3*a* is stored.

The score table 33 is a table in which a hobby score is related to each user ID. The hobby attribute values include "gourmet", "movie", "baseball", etc. The hobby score is indicated to each hobby attribute value for each user ID. The hobby score indicates a greater interest as it goes closer to 1 and a less interest as it goes closer to 0.

For example, it is apparent that the user of the user ID "00003" is interested in "movie" because the hobby score of "movie" is "1.0", and the user of the user ID "00002" is not interested in "gourmet" at all because the hobby score of "gourmet" is "0.0".

FIG. 6 is an illustration illustrating a data structure of an occupation estimating model. In FIG. 6, the occupation estimating model 34 is a table in which an occupation score is related to each keyword. The occupation attribute values correspond to the attribute values of the reference distribution 1, and include "middle and high school student", "others", etc. The occupation score is indicated for each occupation value for each keyword. The occupation score indicates a higher possibility of being the corresponding occupation value as it goes closer to "1". Additionally, the occupation value indicates less correlation with the corresponding occupation value as it goes closer to 0. Further, the occupation value indicates a lower possibility of being the corresponding occupation value, that is, a higher possibility of being other occupation values as it goes closer to −1.

For example, if the keyword "club activity" appears in the blog 3*a*, it indicates raising a possibility of the user who is the creator (blogger) of the blog 3*a* being a middle and high school student by "0.5" point, and raising a possibility of being other occupations by "0.01" point.

FIG. 7 is an illustration illustrating a data structure of a keyword versus user table. In FIG. 7, the keyword versus user table 35 is a table in which a user ID list is related to each user ID for each keyword. Each keyword is one of the plurality of keywords used in the search. The ID of the user of the blog 3*a* in which the keyword appears is indicated in relation to the keyword. For example, if the keyword is "club activity", the user ID "00002", "00383", etc., is related to.

Figure 8:
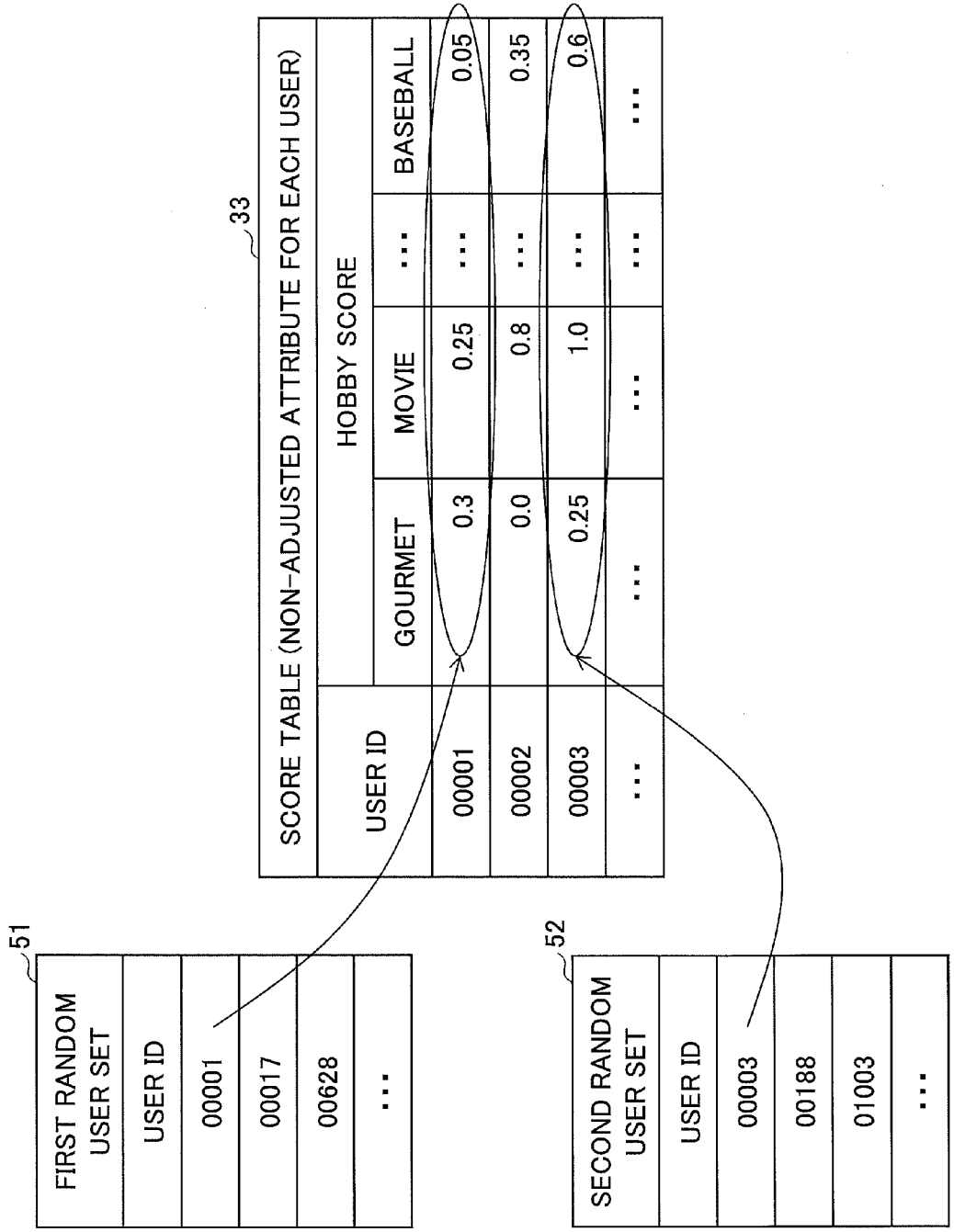
FIG. 8 is an illustration of data of a user set selected at random from a population.

FIG. 8 is an example of data of a user set selected at random from the population. In FIG. 8, user IDs selected at random from the respective populations are recorded in each of first and second random user sets 51 and 52 created by the user set creating part 42.

The first and second random user sets 51 and 52 and the score table 33 of the non-adjusted attribute for each user can be related with each other by the user ID. The hobby score of each hobby attribute value corresponding to the user ID (score distribution) can be acquired from the score table 33.

The first and second random user sets 51 and 52 are used by the score distribution threshold value calculating part 43 to calculate the allowable error threshold value 53.

FIG. 9 is an illustration illustrating a data structure of the new user candidate set. In FIG. 9, the new user candidate set 55 is a list indicating the ID of the user for which the blog 3*a* is collected by the collecting part 45.

FIG. 10 is an illustration illustrating a data structure of the keyword for each user table. In FIG. 10, the keyword for each user table 56 is a table in which each keyword appearing in the blog 3*a* is related to the number of appearances of the keyword for each user ID of the new user candidate set 55. The keyword for each user table 56 contains items such as the user ID and the keyword.

A result of collection of the latest 10 articles of each user is indicated in the item of keyword. That is, keywords that appear in the articles and the number of appearances of each keyword are indicated in the item of keyword.

For example, the keywords "club activity ×3, friend ×2, game ×5, . . . " are indicated for the user ID "00002". It is indicated that the keyword "club activity" appears 3 times, the keyword "friend" appears 2 times, and the keyword "game" appears 5 times.

FIG. 11 is an illustration illustrating a data structure of the estimated attribute value for each user table. In FIG. 11, the estimated attribute value for each user table 57 is a table in which the estimated value of each occupation attribute value and the estimated attribute are related with each other for each user ID indicated in the new user candidate set 54.

The occupation attribute values includes "middle and high school student", "others", etc. The estimated value estimated by the attribute estimating part 46 is indicated for each occupation attribute value. The estimated value indicates a higher possibility of being one's occupation as it is a higher value, and a lower possibility of being one's occupation as it is a lower value. The estimated attribute indicates an occupation value indicating the highest value from the estimated value of each occupation attribute value.

FIG. 12 is an illustration illustrating a data example of the new user list. In FIG. 12, the user list 58 is a list created for lacking occupation attribute value, and is a list of user IDs to be replenished as a new user in the population 31.

For example, it is indicated that the user IDs "00002", "00383", "00876", etc., are replenished as a new user for the occupation attribute value "middle and high school student".

Figure 13:
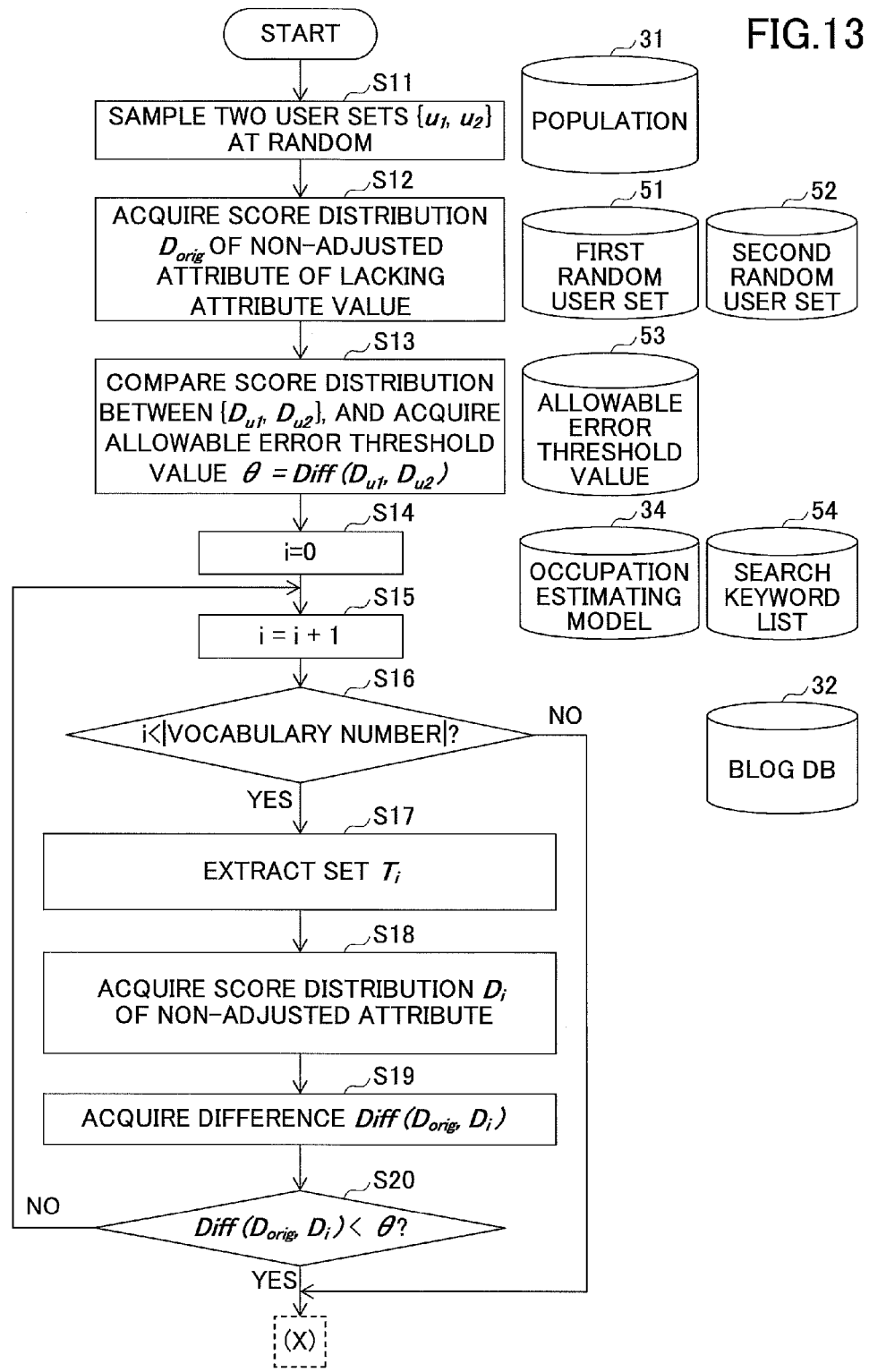
FIG. 13 is a flowchart of a prat of a new user replenishing process.
Figure 14:
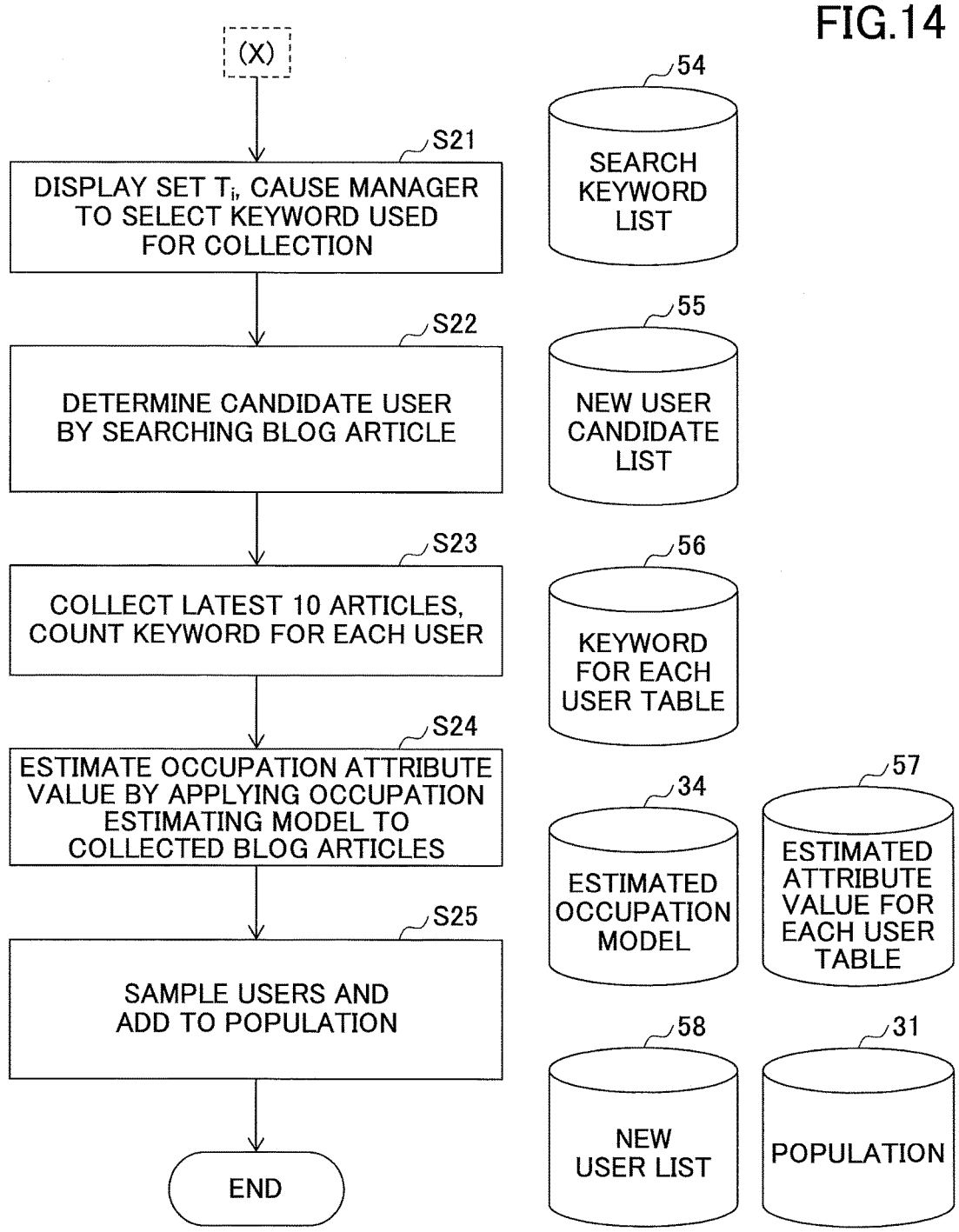
FIG. 14 is a flowchart of another prat of the new user replenishing process.

A description is given below of a new user replenishing process according to the present embodiment. FIGS. 13 and 14 are flowcharts for explaining the new user replenishing process. In FIGS. 13 and 14, a description is given of a case where the lacking attribute value is the occupation attribute value "middle and high school student". The same process may be performed for other occupation attribute values.

In FIG. 13, the user set creating part 42 creates two random user sets $u_1$ and $u_2$ from the score table 33 of the non-adjusted attribute for each user. Here, user sets $u_1$ and $u_2$ are sets of user IDs extracted from the user IDs of which occupation indicates "middle and high school student" at random by referring to the population 31. The user IDs of the random user set $u_1$ correspond to that of the first random user set 51, and the user IDs of the random user set $u_2$ correspond to that of the second random user set 52.

Then, the score distribution threshold value calculating part 43 calculates a score distribution $D_{orig}$ of the non-adjusted attribute of the lacking attribute value (step S12). The score distribution $D_{orig}$ can be calculated by the following formulas (1) and (2).

$$D_{orig} = \{d_{orig,h1}, d_{orig,h2}, \ldots, d_{orig,hm}\} \quad (1)$$

Here, h1 through hm correspond to the hobby attribute values "gourmet", "movie", . . . , "baseball", etc.

$$d_{orig,h} = \{r_{orig,h \cdot s1}, r_{orig,h \cdot s2} \ldots, r_{orig,h \cdot sn}\} \quad (2)$$

($r_{orig,h \cdot s}$ is a ratio of the number of persons of the score s of the hobby (for example, increment by 0.05))

The score distribution threshold value calculating part 43 compares non-adjusted attribute score distributions $D_{u1}$ and $D_{u2}$ with each other to acquire an allowable error threshold value $\theta = \text{Diff}(D_{u1}, D_{u2})$ (step S13). The score distribution threshold value calculating part 43 calculates the non-adjusted score distributions $D_{u1}$ and $D_{u2}$ by applying the above mentioned formulas (1) and (2) to each of the random user sets $u_1$ and $u_2$. The allowable error threshold value $\theta$ can be acquired by the difference between the non-adjusted attribute score distributions $D_{u1}$ and $D_{u2}$. The allowable error threshold value $\theta$ corresponds to the allowable error threshold value 53.

The score distribution threshold value calculating part 43 calculates each hobby h by the following formula (3), which is a sum of squares of a user number ratio $r_{u,h \cdot s}$ of each score s.

$$\theta = \Sigma_{h \in hobbies} \Sigma_{s \in scores} (|r_{u1,h \cdot s}| - |r_{u2,h \cdot s}|)^2 \quad (3)$$

Figure 15A:
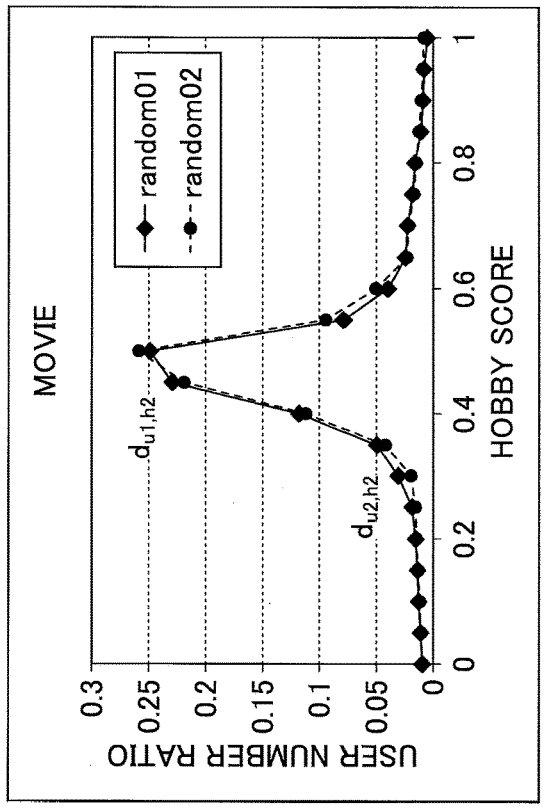
FIG. 15A is a graph indicating an example of a non-adjusted score distribution of a random user set.
Figure 15B:
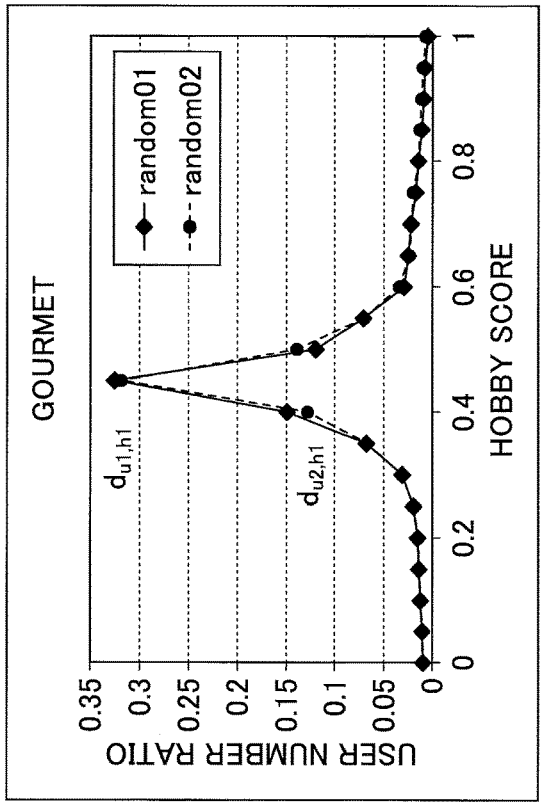
FIG. 15B is a graph indicating another example of the non-adjusted score distribution of the random user set.

FIGS. 15A and 15B illustrate examples of the non-adjusted attribute score distributions of the random user sets $u_1$ and $u_2$ in a case of the occupation attribute value "middle and high school student" with respect to each of the hobby attribute values "gourmet" and "movie". In FIGS. 15A and 15B, the horizontal axis represents a hobby score, which is a degree of interest to the hobby, and the vertical axis represents a user number ratio.

In FIG. 15A, with respect to the hobby attribute value "gourmet" ($h_1$), the non-adjusted attribute score distribution of the random user set $u_1$ is indicated by $d_{u1,h1}$, and the non-adjusted attribute score distribution of the random user set $u_2$ is indicated by $d_{u2,h1}$.

Similarly, in FIG. 15B, with respect to the hobby attribute value "gourmet" ($h_2$), the non-adjusted attribute score distribution of the random user set $u_1$ is indicated by $d_{u1,h2}$, and the non-adjusted attribute score distribution of the random user set $u_2$ is indicated by $d_{u2,h2}$. Thus, the allowable error threshold value $\theta$ is obtained by calculating a sum of square of the difference for each hobby attribute value by the formula (3).

Returning to FIG. 13, the process of steps S14 through S20 corresponds to the process performed by the keyword list creating part 44. The keyword is determined by the process of steps S14 through S20 using the allowable error threshold value $\theta$ so that it becomes the same as the distribution of the occupation attribute value that is the non-adjusted attribute of the population 31. First, the keyword list creating part 44 initializes the parameter i to be zero (step S14).

The keyword list creating part 44 increments the parameter i (step S16), and determines whether the parameter i is greater than or equal to a vocabulary number (step S16). The vocabulary number may be less than or equal to the total number of values of the keyword, such as "club activity", "test", etc., retained by the occupation estimating model 34. If the parameter i is greater than the vocabulary number, the keyword list creating part 44 proceeds to step S21 of FIG. 14.

If the parameter i is less than the vocabulary number, the keyword list creating part 44 extracts a set Ti, which is a set of i keywords of the higher rank that are useful for classifying occupation attribute values to be acquired, from the occupation estimating model 34 (step S17). The "keywords useful for classifying occupation attribute values to be acquired" are keywords that raise, for example, "likeliness of a middle and high school student". The i keywords of the higher rank is extracted from the occupation estimating model 34 in an order starting from one having the value of the occupation attribute value "middle and high school student" is higher.

The keyword list creating part 44 extracts a user who contributed an article containing any one of the keywords of the set Ti from the blog articles retained in the blog DB 32 to acquire the non-adjusted attribute score distribution Di (step S18). That is, in step S18, the keyword list creating part 44 extracts a user who contributed an article containing any one of the keywords of the set Ti by referring to the keyword versus user table 35, and acquires the score distribution Di of the hobby attribute.

Then, the keyword list creating part 44 acquires a distribution difference Diff($D_{orig}$, Di) between the distribution $D_{orig}$ of the population 31 and the distribution Di of the occupation attribute value (step S19). The distribution difference Diff($D_{orig}$, Di) may be obtained by applying the formula (3) to the distribution $D_{orig}$ and the distribution Di.

Then, the keyword list creating part 44 determines whether the distribution difference Diff($D_{orig}$, Di) acquired in step S19 is less than θ acquired in step S13 (step S20). If the distribution difference Diff($D_{orig}$, Di) is greater than or equal to θ, the keyword list creating part 44 determines that it has not been close to the ratio of the occupation attribute value of the population 31, and returns to step S15 to add further the i-th keyword and repeats the same process as the above-mentioned process. On the other hand, if the distribution difference Diff($D_{orig}$, Di) is less than θ, the keyword list creating part 44 proceeds to step S21 of FIG. 14.

Figure 16B:
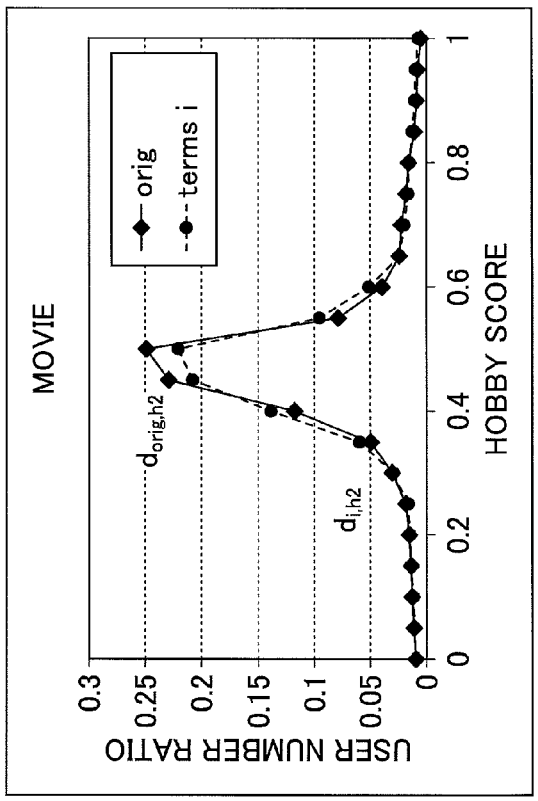
FIG. 16B is a graph indicating another example of the non-adjusted score distribution of the population and the insufficient occupation attribute value.
Figure 16A:
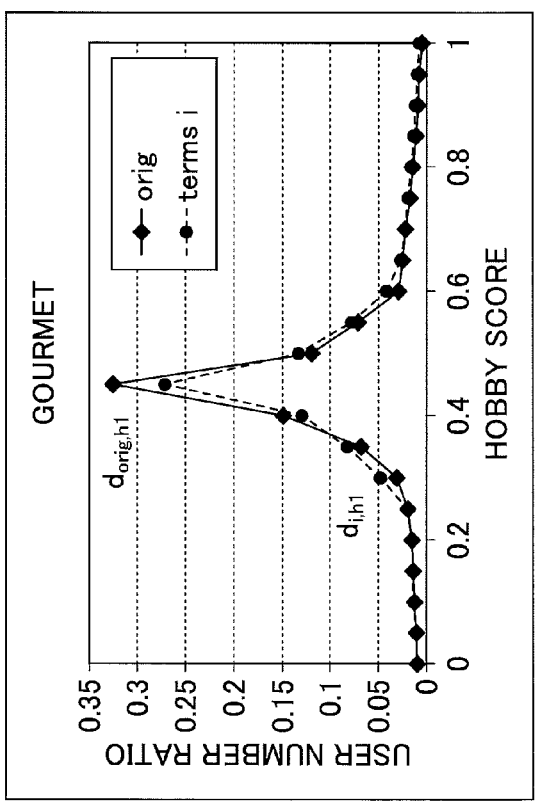
FIG. 16A is a graph indicating an example of a non-adjusted score distribution of a population and an insufficient occupation attribute value.

FIGS. 16A and 16B illustrate examples of the non-adjusted score distribution of the population 31 and the lacking occupation attribute value "middle and high school student" with respect to each of the hobby attribute values "gourmet" and "movie". In FIGS. 16A and 16B, the horizontal axis represents a hobby score, which is a degree of interest in the hobby, and the vertical axis represents a user number ratio.

In FIG. 16A, with respect to the hobby attribute value "gourmet" (set as $h_1$), the non-adjusted attribute score distribution of the population 31 is indicated by $d_{orig,h1}$, and the non-adjusted attribute score distribution of the lacking occupation attribute value "middle and high school student" is indicated by $d_{i,h1}$.

Similarly, in FIG. 16B, with respect to the hobby attribute value "gourmet" (set as $h_2$), the non-adjusted attribute score distribution of the population 31 is indicated by $d_{orig,h2}$, and the non-adjusted attribute score distribution of the lacking occupation attribute value "middle and high school student" is indicated by $d_{i,h2}$. Thus, the distribution difference Diff ($D_{orig}$, Di) is obtained by calculating a sum of square of the difference for each hobby attribute value by the formula (3).

Such a process is performed for each time the keyword is added to the search keyword set Ti in the order from the higher value of the estimating value of the occupation attribute value "middle of high school student" of the occupation estimating model 34 (FIG. 6). According to the occupation estimated model 34 (FIG. 6), the process at the first time is performed with the search keyword set Ti={club activity}. The second time is performed with the search keyword set T2={club activity, test}. The third time is performed with the search keyword set T3={club activity, test, class}. The fourth time is performed with the search keyword set T4={club activity, test, class, school}.

If the distribution difference Diff ($D_{orig}$, Di) becomes less than θ in the fourth time process, the keyword list creating part 44 ends the repetition of the process of steps S15 through S20. Then, the process by the keyword list creating part 44 continues to step S21 of FIG. 14.

In FIG. 14, the keyword list creating part 44 causes the display device 15 to display the search keyword list 54 to cause the manager of the data collecting apparatus 100 to select a keyword (step S21). For example, the keyword list 54 is displayed on the display device 15 so that the search keyword set T4={club activity, test, class, school} is selectable, and the keyword selected by the manager is stored in the search keyword list 54. The search keyword list 54 contains a part or all of the search keyword set T4 selected by the manager, and the manager permits newly adding the keyword.

For example, if the manager judges that the keyword "test" in the set Ti={club activity, test, class, school} is inappropriate for collecting the occupation attribute value "middle and high school student" because the keyword "test" is used by a person other than a middle and high school student when contributing the "contribution test", "program test", etc., the manager may set Ti={club activity, class, school}.

The collecting part 45 performs an OR search on the blog article from the blog server 3 by using the selected search keyword list 54 to determine a candidate user (step S22). If a blog article containing any one of the keyword in the search keyword list 54 is searched, the user of the searched blog article is determined as a candidate user. The new user candidate list 55 indicating the ID of the determined user is created in the storage part 130.

The collecting part 45 collects the latest 10 articles with respect to the blog server 3, and counts keywords for each user (step S23). That is, the collecting part 45 counts the keywords by searching the related blog article for each user ID, and creates the keyword for each user table 56 in the storage part 130.

The attribute estimating part 46 creates the estimated attribute value for each user table 57 in the storage part 130 by applying the occupation estimated model 34 to the collected blog articles by using the estimated attribute value for each user table 56 (step S24). The attribute estimating part 46 identifies the occupation attribute value having a highest estimated value for each user ID in the created estimated attribute value for each user table 57, and determines the identified occupation attribute value to be the occupation of the user and sets the occupation attribute value to the estimated attribute of the estimated attribute value for each user table 57.

In the example of FIG. 11, the "middle and high school student" is set to the estimated attribute by relating to the user ID "00002" because the estimated value "0.53" of the occupation attribute value "middle and high school student" indicates the highest value with respect to the user ID "00002". The "others" is set to the estimated attribute with respect to the user ID "00014". The "middle and high school student" is set to the estimated attribute with respect to the user ID "00383".

Then, the sampling part 47 samples the lacking users at random from the users estimated as having the target occupation attribute value, and adds the sampled users to the population 31 (step S25).

For example, if the occupation attribute value "middle and high school student" is lacking, the sampling part 47 extracts the user ID for which the occupation attribute value "middle and high school student" is set to the estimated attribute in the estimated attribute value for each user table 57, and creates the new user list 58 (FIG. 12) in the storage part 130. The sampling part 47 replenishes the population 31 using the new user list 58.

As mentioned above, in the data collecting apparatus 100 according to the present embodiment, users having the lacking occupation attribute value can be replenished while maintaining the attribute ratio of the population of the investigation target.

In the present embodiment, users of the collection target are not selected at random but selected only users who have contributed blog articles containing a keyword characteristic to a user to be replenished at least once.

According to a technique to set a keyword at random, only users who have contributed blog articles of a specific subject may be collected, which may result in creating a population that does not reflect actual conditions of consumers. However, according to the present embodiment, because a keyword is set so that a tendency of the contents of contributions of the users to be collected avoids a bias, the attribute ratio of the population of the investigation target can be maintained constant. Accordingly, the problems mentioned before can be solved.

All examples and conditional language recited herein are intended for pedagogical purposes to aid the reader in understanding the principles of the invention and the concepts contributed by the inventor to furthering the art, and are to be construed a being without limitation to such specifically recited examples and conditions, nor does the organization of such examples in the specification relates to a showing of the superiority and inferiority of the invention. Although the embodiment(s) of the present invention (s) has(have) been described in detail, it should be understood that the various changes, substitutions, and alterations could be made hereto without departing from the spirit and scope of the invention.

What is claimed is:

1. A non-transitory computer readable recording medium storing therein a group forming program that causes a computer to execute a process comprising:

extracting a plurality of keywords from public information of a first group of publishers including a publisher for which an attribute value regarding a first attribute is calculated as corresponding to a predetermined attribute value, the first attribute being an attribute with respect to each publisher publishing information, the attribute value of the first attribute varying with respect to passage of time;

selecting, from the plurality of keywords, correlated keywords based on a correlation between the predetermined attribute value and each of the plurality of keywords;

determining a number of the correlated keywords based on a difference between a distribution of the correlated keywords in the public information of the first group of publishers and another distribution of the correlated keywords in public information extracted by using the correlated keywords;

forming a second publisher group with respect to new public information by forming a publisher group of the new public information containing the determined number of the correlated keywords; and forming a new publisher group corresponding to the first publisher group by using one or more publishers whose attribute value regarding estimated the first attribute is calculated as corresponding to the predetermined attribute value from among publishers contained in the second publisher group.

2. The non-transitory computer readable recording medium as claimed in claim 1, wherein the correlated keywords are selected in a descending order of the correlation from the plurality of keywords.

3. A non-transitory computer readable recording medium storing therein a data collecting program that collects data of publishers, the data collecting program causes a computer to execute a process comprising:

creating a keyword for searching data of publishers having a specific attribute value of a first attribute with respect to a publisher population based on respective appearance distributions of attribute values of a second attribute, the second attribute being different from the first attribute, the first attribute being varying with passage of time, in which the data of the publishers having the specific attribute value become insufficient due to the passage of the time;

collecting the data by a search using the keyword;

specifying one attribute value from among a plurality of attribute values of the first attribute for each of the publishers of which the data are collected, by using respective correlation values of the keyword with respect to the plurality of attribute values of the first attribute; and replenishing in the publisher population with data of the publishers having the specific attribute value of the first attribute from the collected data.

4. The data collecting method as claimed in claim 3, wherein said computer performs a process of:

calculating a population distribution of the second attribute having the specific attribute value of the first attribute with respect to the publication population;

calculating a collected data distribution of the second attribute from the data collected; and increasing a number of keywords relating to the first attribute to replenish until a distribution difference between the collected data distribution and the population distribution falls within a threshold value.

5. The data collecting method as claimed in claim 4, wherein the computer performs a process of:

creating a first investigation target set and a second investigation target set from the publisher population at random;

calculating a first distribution of the second attribute of the first investigation target set;

calculating a second distribution of the second attribute of the second investigation target set; and acquiring the threshold value by calculating a difference between the first distribution and the second distribution.

6. The data collecting method as claimed in claim 5, wherein the computer performs a process of:

setting the investigation targets of the data that is OR-searched by the keyword as new investigation target candidates;

estimating the first attribute of the new investigation target candidate; and replenishing the population by the new investigation target candidates in an order starting from the candidate having a higher possibility of being the first attribute based on the estimated first attribute.

7. The data collecting method as claimed in claim 3, wherein the data is blog data.

8. The data collecting method as claimed in claim 3, wherein the first attribute is an occupation attribute having an attribute value of at least one of a middle and high school student, a university student, an employed person, a housewife and a senior, and the first attribute is an occupation attribute that is maintained at a fixed ratio in the population.

9. The data collecting method as claimed in claim 3, wherein the second attribute is a hobby attribute having at least one of attribute values related to a preference of the investigation targets.

10. A data collecting apparatus that collects data of publishers, the data collecting apparatus comprising:
- a memory; and
- a processor coupled to the memory and the processor configured to
- create a keyword for searching the data of publishers having a specific attribute value of a first attribute with respect to a publisher population of based on respective appearance distributions of attribute values of a second attribute, the second attribute being different from the first attribute, the first attribute being varying with passage of time, in which the data of the publishers having the specific attribute value become insufficient due to the passage of the time;
- collect the data by a search using the keyword;
- specify one attribute value from among a plurality of attribute values of the first attribute for each of the publishers of which the data are collected, by using respective correlation values of the keyword with respect to the plurality of attribute values of the first attribute; and
- replenish the publisher population with data of the publishers having the specific attribute value of the first attribute from the collected data.

11. A data collecting method by a computer, comprising:

creating a keyword for searching data of publishers having a specific attribute value of a first attribute with respect to a publisher population based on respective appearance distributions of attribute values of data having a second attribute, the second attribute being different from the first attribute, the first attribute being varying with passage of time, in which the data of the publishers having the specific attribute value become insufficient due to the passage of the time;

collecting the data by a search using the keyword;

specifying one attribute value from among a plurality of attribute values of the first attribute for each of the publishers of which the data are collected, by using respective correlation values of the keyword with respect to the plurality of attribute values of the first attribute; and replenishing in the publisher population with data of the publishers having the specific attribute value of the first attribute from the collected data.

* * * * *